United States Patent
Leanza

(10) Patent No.: US 9,469,329 B1
(45) Date of Patent: Oct. 18, 2016

(54) INSTRUMENT PANEL FRAME ASSEMBLY AND METHODS OF USE AND MANUFACTURE THEREOF

(71) Applicant: Honda Motor Co., Ltd., Tokyo (JP)

(72) Inventor: Anthony John Leanza, Powell, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/703,344

(22) Filed: May 4, 2015

(51) Int. Cl.
  *B62D 25/14* (2006.01)
  *B62D 1/10* (2006.01)
(52) U.S. Cl.
  CPC ............. *B62D 1/10* (2013.01); *B62D 25/14* (2013.01); *B62D 25/145* (2013.01)
(58) Field of Classification Search
  CPC .............................. B62D 1/16; B62D 25/145
  USPC ................. 280/779; 180/90; 296/70, 193.02; 74/492
  See application file for complete search history.

(56) References Cited

U.S. PATENT DOCUMENTS

| | | | |
|---|---|---|---|
| 4,690,432 A * | 9/1987 | Sakamoto | B60K 37/00 180/90 |
| 5,311,960 A | 5/1994 | Kukainis et al. | |
| 5,333,701 A | 8/1994 | Izumi | |
| 5,427,411 A * | 6/1995 | Iwasaki | B62D 1/197 280/777 |
| 5,676,216 A | 10/1997 | Palma et al. | |
| 5,857,726 A | 1/1999 | Yokoyama et al. | |
| 6,186,547 B1 | 2/2001 | Skabrond et al. | |
| 8,328,237 B2 | 12/2012 | Woo et al. | |

* cited by examiner

*Primary Examiner* — Keith Frisby
(74) *Attorney, Agent, or Firm* — Kenealy Vaidya LLP

(57) ABSTRACT

Some embodiments are directed to a frame assembly that includes a supplemental beam portion, and a main beam portion adjacent the supplemental beam portion. The main beam portion includes a central portion as well as left and right portions disposed at opposing sides of the central portion. The central portion defines a recessed portion that is shaped such that the left and right portions each define in aggregate a relatively larger cross-sectional area than the central portion. The recessed portion is configured to enable the central portion to be able to at least partially enclose a steering column assembly. A mounting assembly is configured to mount the steering column assembly to the main beam portion with the central portion at least partially enclosing the steering column assembly. The mounting assembly also enhances stiffness of the central portion to thereby at least partially counteract stiffness lost based on the recessed portion.

20 Claims, 8 Drawing Sheets

INSTRUMENT PANEL FRAME ASSEMBLY AND METHODS OF USE AND MANUFACTURE THEREOF

BACKGROUND

The disclosed subject matter relates to an instrument panel assembly for a vehicle, and methods of use and manufacture thereof. More particularly, the disclosed subject matter relates to methods and apparatus for connecting a steering column assembly to a frame assembly of the instrument panel assembly.

Vehicles can include an instrument panel assembly (also referred to as an instrument panel, an IP, a dashboard or a dash) that spans a certain width, such as the entire width of the interior of the vehicle and lies adjacent the base of the windshield. The instrument panel assembly can house and/or support systems and components accessible by the driver and/or the passenger(s) of the vehicle. These systems and components can include but are not limited to a steering column assembly, instrument cluster (such as but not limited to, vehicle speed, fuel gauge, engine temperature gauge, engine tachometer, engine oil pressure, currently engaged transmission gear, warning light(s), odometer, and trip odometer), electrical switch(es), wired electrical connections (such as but not limited to a USB port, 12 volt port, etc.), HVAC system, audio system, navigation system, infotainment system, glove box, and one or more airbag assemblies.

SUMMARY

The instrument panel assembly can include a frame assembly and one or more trim panels. The frame assembly can include mounting points for the component(s), system(s) and/or elements(s) of the components and systems discussed above, and for the trim panel(s). The trim panels can provide an aesthetic (visual and/or tactile) cover for the frame assembly and other component(s) and/or systems of the instrument panel assembly.

The frame assembly can be connected to A-pillars of the vehicle and can be a load bearing component of the vehicle's frame assembly. The frame assembly can include at least one beam member that extends from one of the A-pillars to a central portion of the frame assembly. One or more bolts can secure the steering column assembly to the beam member. The steering column assembly can be bolted to the beam member so that the steering column assembly hangs below the beam member. As such, the beam member can be referred as a steering hanger beam. In this arrangement, the steering column assembly can be bolted to the beam member with the bolts extending generally in a vertical direction.

Alternatively, the steering column assembly can be bolted to a firewall, which separates the passenger compartment from the engine compartment (or the front trunk if the engine is a mid-mounted engine or a rear-mounted engine). In this configuration, the steering column assembly can be bolted to the firewall with bolts extending generally in a horizontal direction.

However, the related art instrument panel frames are subject to various disadvantages. The instrument panel frame of each type discussed above can be subject to vibrations transmitted from the engine into the steering wheel and/or vibrations transmitted from the suspension into the steering wheel. The connection between the steering wheel and the instrument panel frame can enhance, dampen or transmit undisturbed vibrations, including some or all of the above vibrations. The operator of the vehicle can perceive certain steering wheel vibration(s) as undesirable.

Other design considerations, such as but not limited to the aesthetic appearance, ease of access to or use of a component(s) of the instrument panel assembly by a user, packaging of a component(s) and/or system(s) supported by or housed within the instrument panel assembly, ease of manufacturing, ease of installation, passenger safety, etc., can limit the effectiveness of the instrument panel assembly in dampening steering wheel vibration(s) that the vehicle operator might perceive as undesirable.

For example, in order to dampen or prevent steering wheel vibration that an operator of the vehicle might perceive as undesirable, the size of the cross-section of the beam member can be designed to be large. However, a large cross-section may cause an observer of the instrument panel to perceive the instrument panel as being aesthetically unpleasing.

In another example, the distance between the center of the steering wheel and the centroid (also referred to as center of mass or center of gravity) of the beam member can be made to be small. However, this small distance can cause the steering wheel position to be perceived by an operator of the vehicle as being physically uncomfortable.

In an attempt to address, overcome or avoid at least one of these shortcomings, the beam member can be designed with complex geometry that can accommodate the steering assembly in a position, such that an operator of the vehicle can perceive the instrument panel assembly as being aesthetically pleasing and the steering wheel position as being physically comfortable. However, the complex geometry can have adverse effects, such as but not limited to an increased cost and/or time for manufacturing the beam member, increased time required for assembling the instrument panel assembly, etc.

In order to avoid providing the beam member with a complex geometry, the beam member can be formed with a small cross-sectional size of simple geometry. To compensate for the reduced stiffness available from the small cross-sectional size, the beam member can be formed with a greater wall thickness. However, this structure can increase the overall weight of the instrument panel frame assembly. The increased weight can adversely affect the design target set for the vehicle's fuel efficiency.

It may therefore be beneficial to provide an instrument panel frame assembly and methods that address at least one of the above and/or other disadvantages of the related art. In particular, it may be beneficial to provide an instrument panel assembly that can include a main beam member that can enable the distance between the centroid of the main beam member and the steering wheel center to be independent of at least one of the design targets discussed above. For example, it may be beneficial to provide the main beam member with a recessed portion including a central portion as well as left and right portions disposed at opposing sides of the central portion, the central portion defining a recessed portion with an opening, the opening extending along at least a longitudinal axis of the vehicle and along the frame assembly from first and second corners on each side of the central portion, the first corner being disposed between the central portion and the left portion, and the second corner being disposed between the central portion and the right portion, wherein the main beam portion is shaped such that the left and right portions each define in aggregate a relatively larger cross-sectional area than the central portion, the opening being configured to enable the central portion to be able to at least partially enclose the steering column assembly that can permit the steering column assembly to be mounted close to the centroid of the main beam member. It may also be beneficial to provide a mounting assembly that can connect the steering column assembly to the main beam member that can enhance the structural rigidity of a main beam assembly in a region adjacent to and including the recessed portion. In some configurations, the frame assembly can include both an upper surface and a side surface extending from the upper surface at an angle directed along at least a portion of the longitudinal axis of the vehicle along the side surface, and the steering column axis can pass through the wheel center point within the opening.

Some embodiments are directed to a frame assembly for supporting a vehicle steering assembly that includes a steering wheel connected to a steering column assembly. The frame assembly can include a supplemental beam portion, and a main beam portion adjacent the supplemental beam portion. The main beam portion can include a central portion as well as left and right portions disposed at opposing sides of the central portion. The central portion can define a recessed portion that is shaped such that the left and right portions each define in aggregate a relatively larger cross-sectional area than the central portion. The recessed portion can be configured to enable the central portion to be able to at least partially enclose the steering column assembly. A mounting assembly can be configured to mount the steering assembly to the main beam portion with the central portion at least partially enclosing the steering column assembly. The mounting assembly can also enhance stiffness of the central portion to thereby at least partially counteract stiffness lost based on the recessed portion.

Some other embodiments are directed to a vehicle instrument panel assembly that can include a vehicle steering assembly, which itself includes a steering wheel connected to a steering column assembly, and a frame assembly for supporting the steering wheel assembly. The frame assembly can include a supplemental beam portion and a main beam portion adjacent the supplemental beam portion. The main beam portion can include a central portion as well as left and right portions disposed at opposing sides of the central portion. The central portion can define a recessed portion that is shaped such that the left and right portions each define in aggregate a relatively larger cross-sectional area than the central portion. The recessed portion can be configured to enable the central portion to be able to at least partially enclose the steering column assembly. A mounting assembly can be configured to mount the steering column assembly to the main beam portion with the central portion at least partially enclosing the steering column assembly. The mounting assembly can also enhance stiffness of the central portion to thereby at least partially counteract stiffness lost based on the recessed portion.

Still other embodiments are directed to a method of manufacturing a vehicle instrument panel assembly. The method can include connecting a steering wheel to a steering column assembly so as to form a vehicle steering assembly; and forming a frame assembly that is capable of supporting the steering wheel assembly. The forming of the frame assembly can include disposing a supplemental beam portion adjacent a main beam portion; forming the main beam portion so as to include a central portion as well as left and right portions disposed at opposing sides of the central portion; and defining a recessed portion in the central portion that is shaped such that the left and right portions each define in aggregate a relatively larger cross-sectional area than the central portion, and that is configured to enable the central portion to be able to at least partially enclose the steering column assembly. The method can also include mounting the steering column assembly to the main beam portion with a mounting assembly, such that the central portion at least partially encloses the steering column assembly; and configuring the mounting assembly so as to also enhance stiffness of the central portion to thereby at least partially counteract stiffness lost based on the recessed portion.

BRIEF DESCRIPTION OF THE DRAWINGS

The disclosed subject matter of the present application will now be described in more detail with reference to exemplary embodiments of the apparatus and method, given by way of example, and with reference to the accompanying drawings, in which.

DETAILED DESCRIPTION OF EXEMPLARY EMBODIMENTS

A few inventive aspects of the disclosed embodiments are explained in detail below with reference to the various figures. Exemplary embodiments are described to illustrate the disclosed subject matter, not to limit its scope, which is defined by the claims. Those of ordinary skill in the art will recognize a number of equivalent variations of the various features provided in the description that follows.

I. Instrument Panel Assembly

Figure 1:
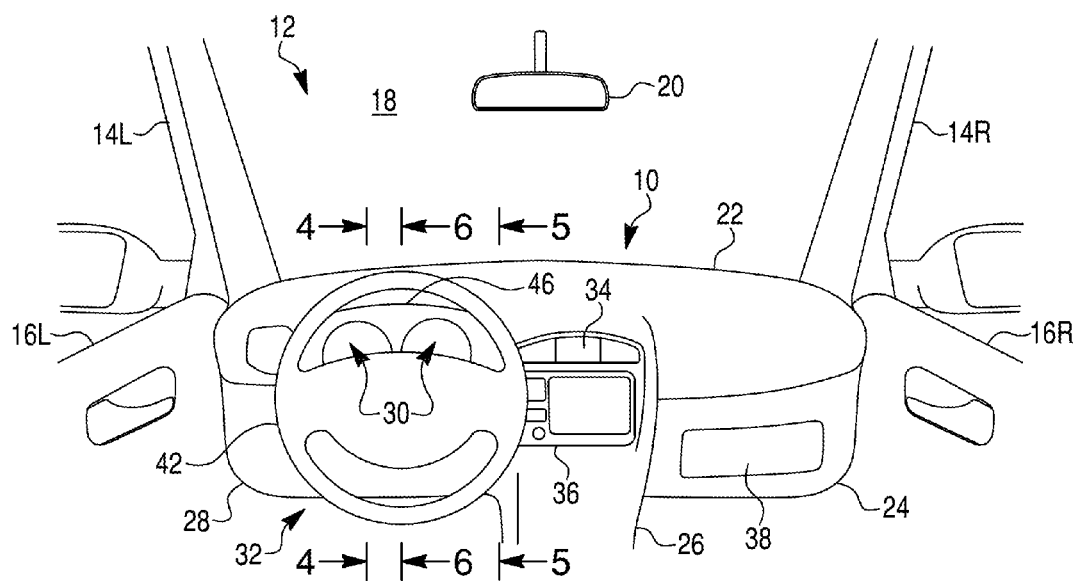
FIG. 1 is a schematic view of a front portion of a passenger cabin of a vehicle in accordance with the disclosed subject matter.

FIG. 1 illustrates an embodiment of an instrument panel assembly 10 for a vehicle 12 made in accordance with the principles of the disclosed subject matter. FIG. 1 portrays a view of a portion of the passenger compartment of the vehicle 12. FIG. 1 illustrates a view toward the front of the vehicle 12. The vehicle 12 can include a pair of A-pillars 14L, 14R, a pair of doors 16L, 16R, a windshield 18 and a rearview mirror 20. The instrument panel assembly 10 can extend across the passenger compartment of the vehicle 12. The instrument panel assembly 10 can be connected to each of the A-pillars 14L, 14R and/or any other appropriate structure of the vehicle 12 such as but not limited to a firewall.

The instrument panel assembly 10 can be divided into a driver portion, a center stack portion and a passenger portion. The driver portion and the passenger portion can be aligned with the driver seat and the front passenger seat, respectively. The center stack portion can extend from the driver portion to the passenger portion. The center stack portion can extend toward the floor of the vehicle 12. Embodiments are intended to include a center stack portion that extends to the floor of the vehicle 12, or alternatively, a center stack that terminates before reaching the floor. Other embodiments are intended to include a center stack portion that can extend to and can be integrated with a center console assembly that extends between the driver seat and the passenger seat.

The instrument panel assembly 10 can include a plurality of trim panels 22, 24, 26, 28, an instrument cluster 30, a steering assembly 32, at least one air vent 34, a control panel assembly 36, and a glove box 38.

Figure 2:
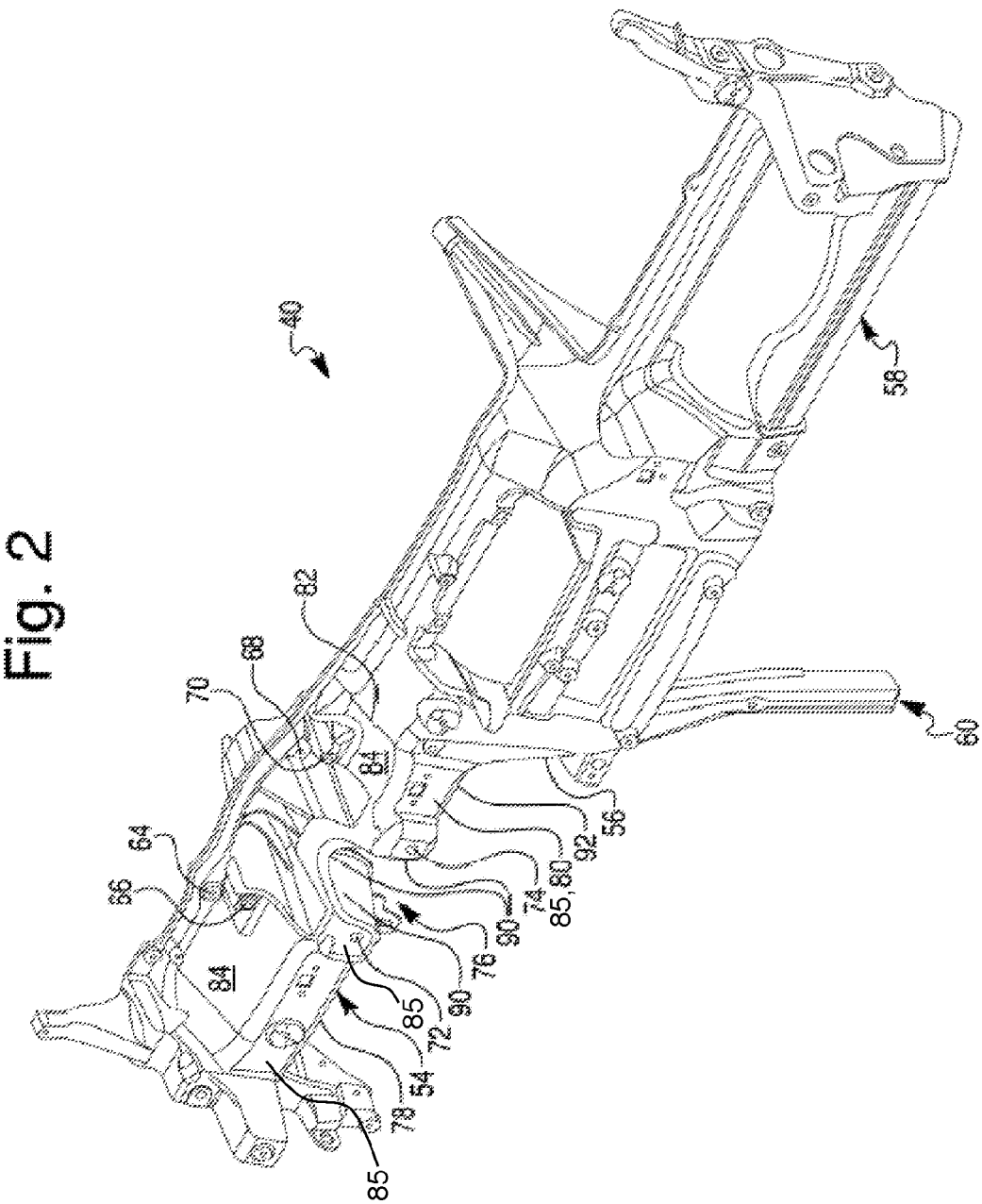
FIG. 2 is a perspective view of the instrument panel frame assembly in accordance with the disclosed subject matter.

Referring to FIG. 2, the instrument panel assembly 10 can include frame assembly 40. The trim panels 22, 24, 26, instrument cluster 30 and the control panel assembly 36 obscure the frame assembly 40 from view in FIG. 1.

Referring to FIG. 1, he upper trim panel 22 can extend across the top of the instrument panel assembly 10. The upper trim panel 22 can lie adjacent each of the passenger trim panel 24, the center stack trim panel 26 and the driver trim panel 28.

The passenger trim panel 24 can extend across the passenger portion of the instrument assembly 10. The passenger trim panel 24 can face the front passenger seat.

The center stack trim panel 26 can extend across the center stack portion of the instrument panel assembly 10. The center stack trim panel can lie adjacent the passenger trim panel 24 and the driver trim panel 28.

The driver trim panel 28 can extend across the driver portion of instrument assembly 10. The driver trim panel 28 can face the driver seat.

Embodiments are intended to include any one or any combination of the trim panels 22, 24, 26, 28 that can be formed from a plurality of components. Other embodiments are intended to include any combination of the trim panels 22, 24, 26, 26, 28 integrated or unitarily formed into a single trim panel.

The instrument cluster 30 can be housed in a cowl 46 (See FIG. 4) of the instrument panel assembly 10. The instrument cluster 30 can include at least one display that can depict at least one operating condition of the vehicle 12, such as but not limited to vehicle speed, engine speed, fuel level, engine coolant temperature, engine oil pressure, engine oil temperature, boost pressure, odometer mileage, trip odometer mileage, turn signal use, high beam use, warning lights/messages, etc.

As will be discussed in detail below and with reference to FIGS. 3, 7 and 8, the steering assembly 32 can be connected to the frame assembly 40. The steering assembly 32 can include a steering wheel 42 and a steering column assembly 44. The steering wheel 42 can be connected to the steering column assembly 44 in any appropriate manner, such as but not limited to splines and one or more mechanical fasteners (such as but not limited to a bolt, screw, etc.). The steering column assembly 44 can include a plurality of shafts 104, 106, 108 connected by at least one flexible, torque transmitting coupling 110 such as but not limited to a universal joint.

The control panel assembly 36 can be mounted on the center stack portion of the instrument panel assembly 10. The control panel assembly 36 can include at least one of a dial, switch, and lever configured to permit the selection of a plurality of settings for an HVAC system (also referred to as a heating, ventilation and air condition system), and an entertainment system (such as but not limited to a radio, a CD-player, an infotainment system, an internet access device, a navigation system, a video playback device, etc.). The control panel assembly 36 can include a display screen configured to indicate the status of one or both of HVAC system and the entertainment system. Embodiments are intended to include a display screen configured as a touch screen display, and any number of the dials, switches or levers of the control panel can be replaced or duplicated by the touch screen display.

II. Frame Assembly

Figure 3:
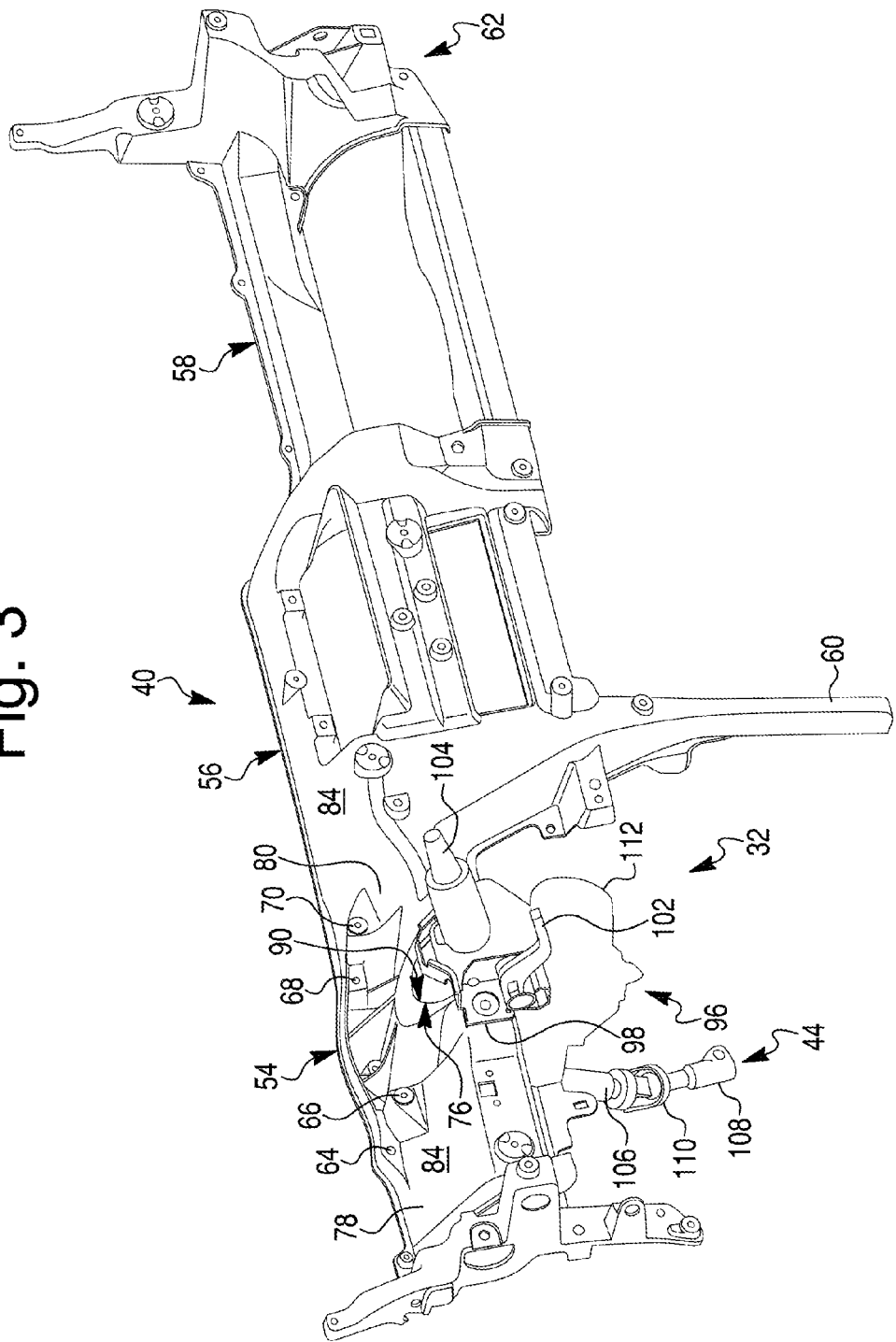
FIG. 3 is a perspective view of showing a steering column assembly connected to an instrument panel frame assembly in accordance with the disclosed subject matter.

Referring to FIGS. 2 and 3, the frame assembly 40 can include a main beam portion 54, a center stack portion 56 and a glove box portion 58. The main beam portion 54, the center stack portion 56 and the glove box portion 58 can be integrally or unitarily formed as a single, homogenous unit by any appropriate process, such as but not limited to die casting, extrusion, molding, stamping, etc., and from any appropriate material, such as but not limited to steel, aluminum, magnesium, titanium, carbon fiber, plastic, fiber reinforced plastic, etc. However, embodiments are intended to include an instrument panel frame 40 formed by any appropriate number of components that can be formed from any appropriate process discussed above using any appropriate material discussed above. The center stack portion 56 and/or the glove box portion 58 can define at least a portion of a supplemental beam portion. The main beam portion 54 can be adjacent to the supplemental beam portion.

The center stack portion 56 can include a plurality of openings and mounting points configured to receive any one component/system of or any combination of components/systems of the control panel assembly 36 discussed above. The center stack portion 56 can include at least one support member 60 extending toward the floor of the vehicle 12. The support member 60 can be configured either as a load-bearing member or as a non-load-bearing member of the instrument panel frame 40. Embodiments are intended to include the omission of the support member(s) 60 from the center stack portion 56. The center stack portion 56 can include any appropriate number of connection points for the center stack trim panel 26.

The glove box portion 58 can include an opening and a plurality of mounting points configured to receive, support and retain the glove box 38 on the instrument panel frame 40. The glove box portion 58 can include a mounting portion 62 configured to connect the right side of the instrument panel frame 40 to the right-side A-pillar 14R shown in FIG. 1 and/or to any other appropriate structural member of the vehicle 12.

The main beam portion 54 can include a plurality of upper mounting points 64, 66, 68, 70 and a plurality of lower mounting points 72, 74, a surround portion 76 and main portions 78, 80 on either side of the surround portion 76.

The mounting points 64, 66, 68, 70, 72 and 74 can be configured as through holes in the main beam portion 54. The instrument cluster 30 can be connected to the upper mounting points 66, 70 in any appropriate manner, such as threaded fasteners, plastic clips, rivets, heat staking, etc. As will be discussed in detail below with respect to FIGS. 7 and 8, the steering column assembly 44 can be connected to the lower mounting points 72, 74. The lower mounting points 72, 74 can be defined in a side wall 85 that abuts the upper wall 84 at an angle.

As discussed above, certain vibration(s) of the steering wheel 42 can be
perceived by the operator of the vehicle 12 to be undesirable. Vibration of the steering wheel 42 can be proportional to the distance D from the centroid 86 of the available space A to the center point 88 of the steering wheel 42. The steering wheel 42 is omitted from FIG. 4 for simplicity and clarity of FIG. 4. In other words, the smaller the distance D between the centroid 86 and the steering wheel center point 88, the less likely the steering wheel 42 will vibrate in a manner that can be perceived as undesirable. Thus, it can be desirable to position the steering wheel center point 88 immediately adjacent the centroid 86. However, other constraints, such as but not limited to packaging interference with the instrument cluster 30, and the distance from the steering wheel 42 to the driver seat, can limit how close to the centroid 86 the steering wheel center 88 can be positioned.

Vibration of the steering wheel 42 also can be inversely proportional to the cross-sectional size of the main beam portion 54. In other words, increasing the cross-sectional size of the main beam portion 54 makes it less likely that an undesirable vibration will be transmitted to the steering wheel 42. Thus, it can be desirable to provide the main beam section 54 with the largest possible cross-sectional area. It also can be desirable to configure the main beam portion 54 with a cross-section shape that can have a centroid located in a position that corresponds to the position the centroid 86 of the available space A. In other words, the main beam portion 54 can have its centroid positioned as close as possible to the surface (or edge) of the main beam portion 54 that is closest to the steering wheel center point 88. However, packaging interference with one or more components of the instrument panel assembly 10, the windshield 18 and the driver legroom, a possible weight penalty for a large cross-sectional area, and an unaesthetic appearance for the instrument panel assembly can cause the cross-sectional size to be smaller than desirable in the context of accommodating a wide range of potentially undesirable vibrations of the steering wheel.

Figure 4:
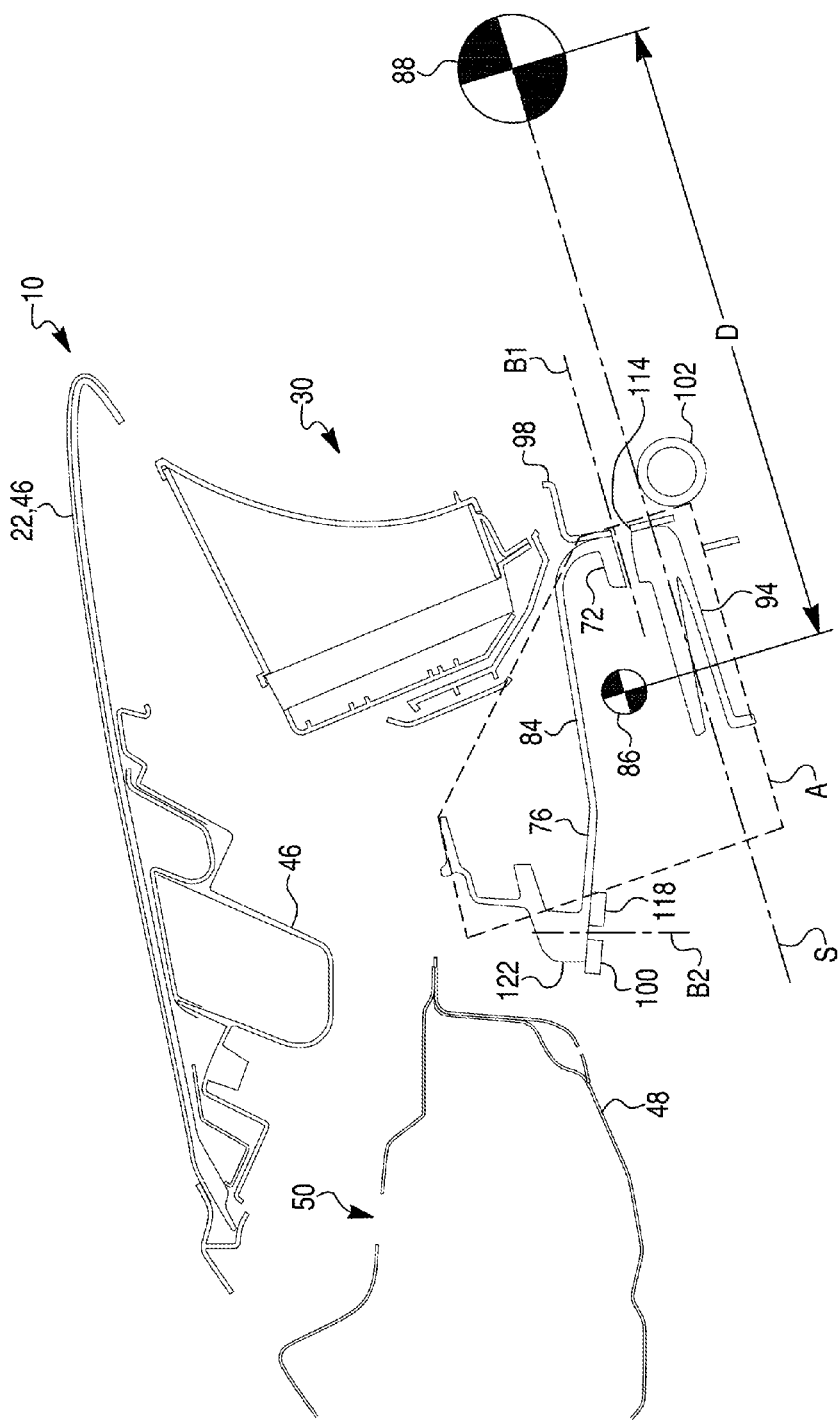
FIG. 4 is a cross-sectional view taken along section 4-4 of FIG. 1 and schematically illustrates principles in accordance with the disclosed subject matter.

FIG. 4 schematically illustrates principles in accordance with the disclosed subject matter. FIG. 4 is a cross-sectional view of the instrument panel assembly 10 of FIG. 1 and shows details of the upper trim panel 22, the cowl 46, one of the instrument gauges of the instrument cluster 30, and an HVAC duct 48 including a windshield vent 50.

FIG. 4 illustrates an available space A that indicates the maximum cross-sectional area and shape available for the main beam section 54 within the instrument panel assembly 10. Although the available space A is shown as being pentagonal, the available space A can have any appropriate shape, such as but not limited to an oval, any polygon, or an irregular shape, that can permit the centroid 86 to be positioned as close as possible to the steering wheel center point 88.

Referring to FIGS. 2 and 3, the main beam portion 54 can include a central beam portion 76, a left beam portion 78 and a right beam portion 80. As will be discussed in detail below, each of the beam portions 76, 78, 80 can be configured in accordance with the principles illustrated in FIG. 4.

Figure 5:
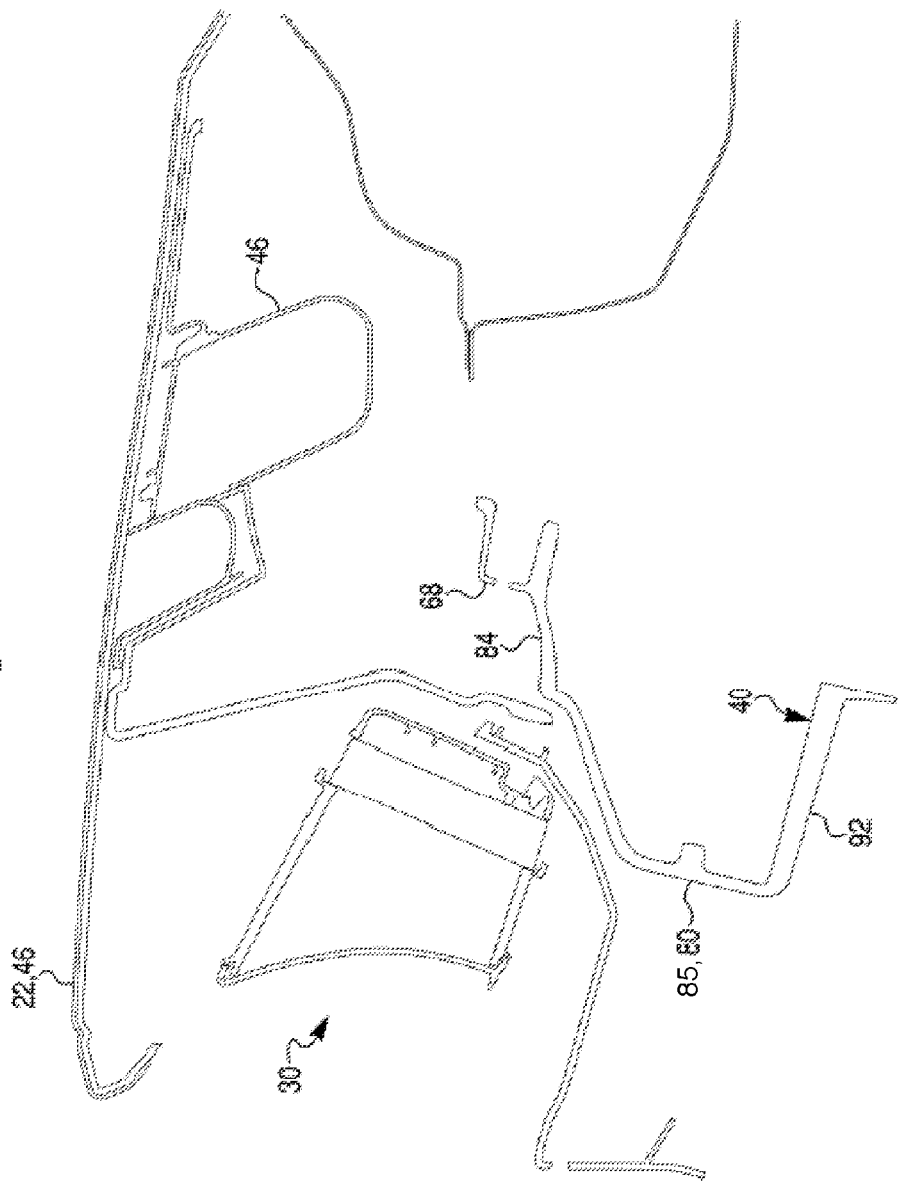
FIG. 5 is a cross-sectional view taken along section 5-5 of FIG. 1.

The right beam portion 80 can extend from the central portion 76 to the border 82 of the center stack portion 56. With the possible exceptions of portions projecting from the upper surface 84 of the frame assembly 40, the right beam portion 80 can have a multi-sided cross-sectional shape as shown in FIG. 5. This cross-sectional shape can generally correspond to the shape of the available area A shown in FIG. 4. The cross-sectional shape of the right beam portion 80 can be substantially the same shape at any cross-section taken between the central beam portion 76 and the border 84 that is parallel to the view of FIG. 5.

The left beam portion 78 can be connected to the left A-pillar shown in FIG. 1. The left beam portion 78 can extend from the left A-pillar to the central beam portion 76. The left beam portion 78 can have a cross-sectional shape that is substantially the same as that of the right beam portion 80. The cross-sectional shape of the left beam portion 78 can be substantially the same shape at any cross-section taken between the left A-pillar shown in FIG. 1 and the central beam portion 76 that is parallel to the view of FIG. 4.

Referring to FIG. 5, the left and right beam portions 78, 80 can be configured to have a relatively large cross-sectional area that can be configured to fit in the available space A of FIG. 4 within the instrument panel assembly 10 on either side of the steering assembly 32. The left and right beam portions 78, 80 can have an open cross-sectional shape that can fit within the available space A illustrated in FIG. 4. However, embodiments are intended to include a left beam portion 78 and/or a right beam portion 80 that has a closed cross-sectional shape, such as but not limited a polygonal shape, an oval shape, an irregular closed shape, etc., that can fit within the available space A.

The left and right beam portions 78, 80 can be configured with a cross-sectional shape that can have a centroid 86 that can be as close as possible to the center point 88 of the steering wheel 42.

Referring to FIGS. 2 and 3, the central beam portion 76 can abut each of the left beam portion 78 and the right beam portion 80. The cross-sectional shape of the central beam portion 76 can be different from that of the left and right beam portions 78, 80. As will be discussed further below, the cross-sectional shape of the central beam portion 76 can be configured to permit the distance D between the frame assembly centroid 86 and the steering wheel center point 88 to be reduced as compared to a central beam portion that has a cross-sectional shape and size that is substantially the same as that of the left and right beam portions.

The central beam portion 76 can be configured such that the upper surface 84 of the frame assembly 40 that extends along the central beam portion 76 can be generally convex. The convex surface of the central beam portion 76 can rise above the upper surface 84 that extends along the left and right beam portions 78, 80.

The central beam portion 76 can include a lower surface 90 that can be generally concave. The lower surface 90 can define a recessed portion in the central beam portion 76.

The recessed portion of the central beam portion 76 can disrupt the cross-sectional shape of the left and right beam portions 78, 80. A comparison of FIGS. 4-6 can illustrate how the central beam portion 76 can be configured to disrupt the cross-sectional shape of the left and right beam portions 78, 80.

Figure 6:
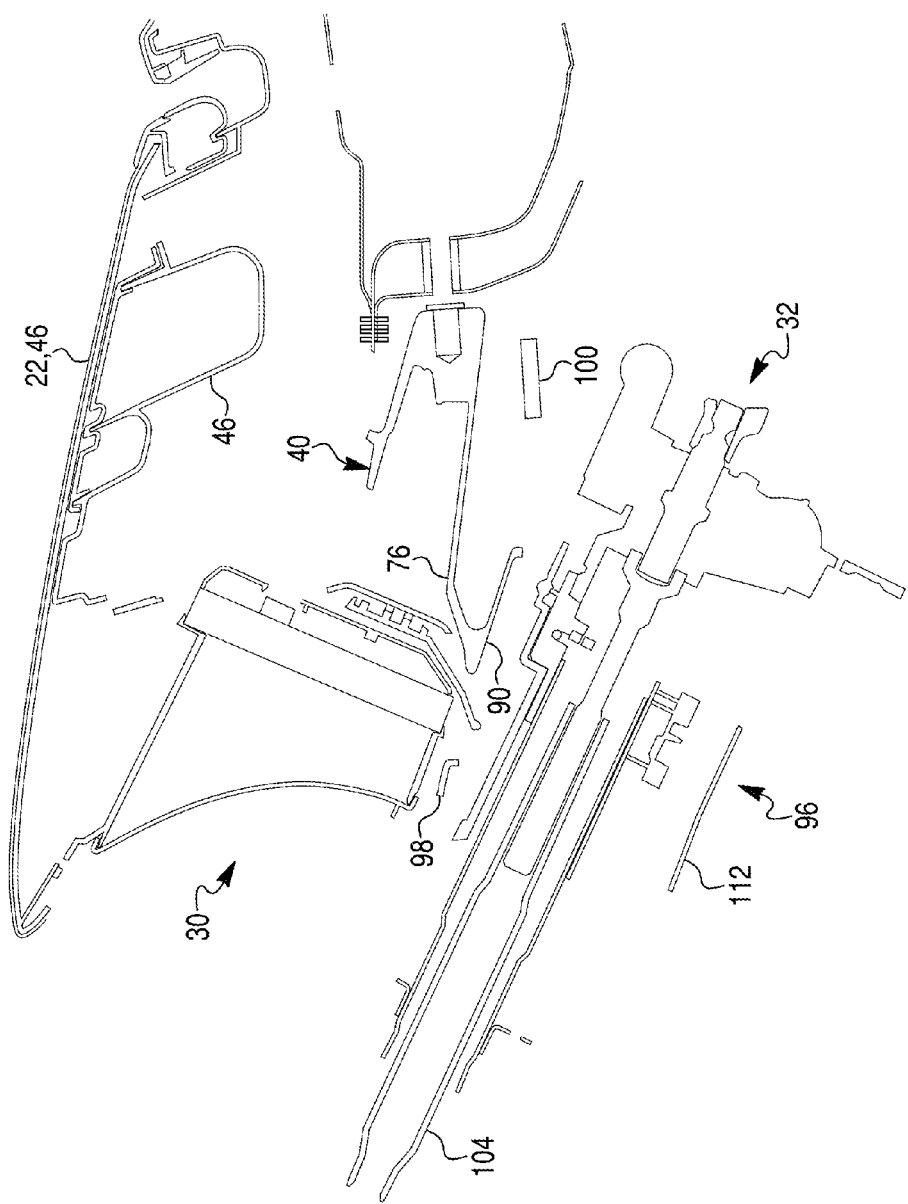
FIG. 6 is a cross-sectional view taken along section 6-6 of FIG. 1.

FIG. 4 is a cross-sectional view taken along 4-4 of FIG. 1 and through the central beam portion 76 and through the lower mounting point 72. FIG. 5 is a cross-sectional view taken along 5-5 of FIG. 1 and through the right beam portion 80 and through the upper mounting point 68. FIG. 6 is a cross-section taken along 6-6 of FIG. 1 and through the central beam portion 76 and aligned with the rotational axis of the steering assembly 32. The transition from FIG. 5 to FIG. 6 shows the lower surface 92 of the right beam portion 80 at a lower elevation as compared to the elevation of the lower surface 90. The transition from FIG. 5 to FIG. 4 shows a second lower surface 94 of the central beam portion 76 at substantially the same elevation as compared to the elevation of the lower surface 90 of the central beam portion 76. Additionally, the elevation of the upper surface 84 along the central beam portion 76 is lower than the elevation of the upper surface 84 along the right beam portion 80.

The recessed portion of the central beam portion 76 can provide a space or opening extending along the longitudinal axis of the vehicle 12 and along the frame assembly 40 in which the steering assembly 32 can be advantageously packaged around the instrument cluster 30. In the exemplary embodiment of FIGS. 1-8, the recessed portion of the central beam portion 76 can be defined by a central portion of the recessed portion. The opening of the frame assembly 40 could extend along the frame assembly 40 from first and second corners on each side of the central portion that can demarcate the opening's protrusion into the frame assembly 40. The first corner may be disposed between the central portion and the left portion, and the second corner could be disposed between the central portion and the right portion. In this configuration, the frame assembly 40 could also include both an upper surface 84 and a lower surface 90. These two surfaces can define a third, side-surface that extends from the upper surface 84 to intersect with the lower surface 90 at an angle acute to the lower surface 90 and a longitudinal axis of the vehicle, as depicted in FIGS. 2, 3, 7 and 8. The third, side surface may extend along a portion of the longitudinal axis of the vehicle 12, and can also extend radially around some or all portions of the opening. In some instances, the recessed portion could take the shape of an arch, also as depicted in FIGS. 2, 3, 7 and 8. The arch can receive the steering assembly 32 so that the steering assembly 32 can be moved inwardly and upwardly relative to the centroid 86 of the left and right beam portions 78, 80. The vibration characteristics of the steering assembly 32 can be enhanced because the distance D between the centroid 86 and the center point 88 can be reduced, and because the left and right beam sections 78, 80 can have a large cross-sectional size. The upper and lower surfaces 84, 90 along the central beam portion 76 can have any appropriate shape, such as but not limited to arcuate, multi-faceted, irregular, etc. In the exemplary embodiment of FIGS. 1-8, the upper surface 84 can be multi-faceted and the lower surface 90 can be arcuate along the central beam portion 76.

III. Mounting Assembly

Figure 7:
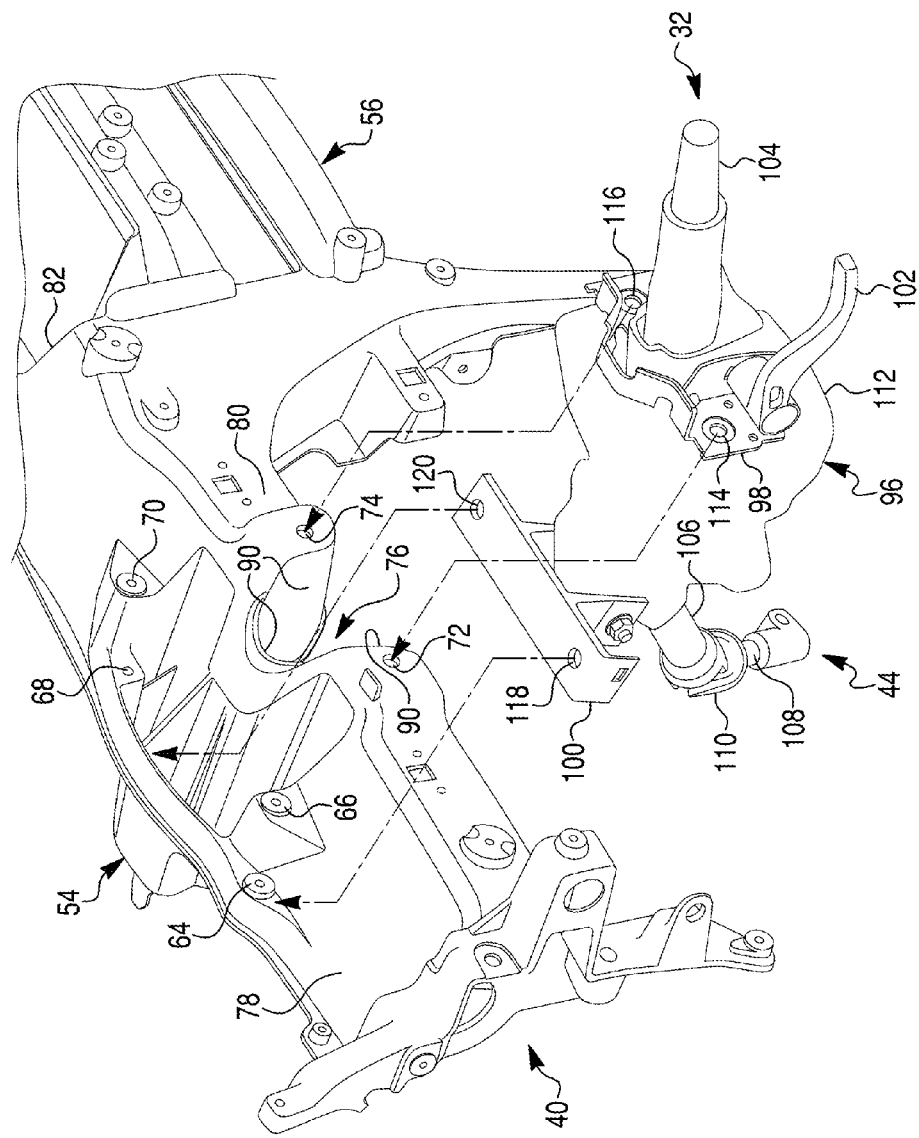
FIG. 7 is an exploded perspective view of the steering assembly and a portion of the instrument panel frame assembly of FIG. 2.
Figure 8:
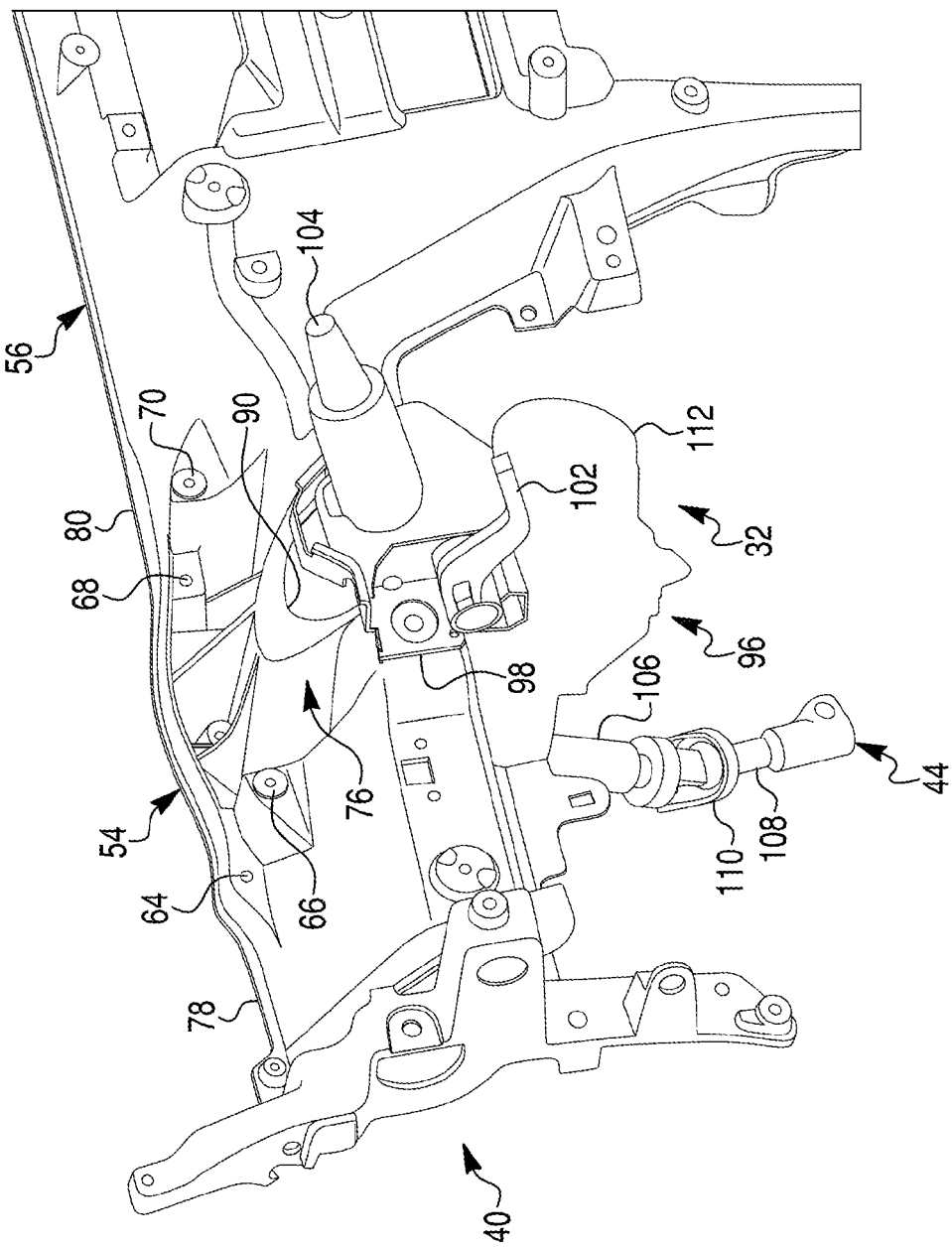
FIG. 8 is an enlarged view of a portion of FIG. 3.

FIG. 7 is an exploded perspective view of the steering assembly 32 and the frame assembly 40 before the connection of these two assemblies. FIG. 8 is an enlarged view of a portion of FIG. 3, and shows the steering assembly 32 connected to the frame assembly 40.

Referring to FIG. 7, the instrument panel assembly can include a mounting assembly 96 configured to secure the steering assembly 32 to the frame assembly 40. The mounting assembly 96 can include a pair of mounting brackets 98, 100, a lever 102 of an adjustment assembly (the details of which are omitted from the figures) for simplicity and clarity of all of the figures) and a housing 112.

The adjustment assembly can be configured in any appropriate manner to permit the operator of the vehicle 12 to adjust the position of the steering wheel 42 shown in FIG. 1 in a generally vertical direction and/or in a generally horizontal direction. This adjustability can permit adjustment of the position of the steering wheel 42 to accommodate vehicle operators of different sizes, such that the steering wheel 42 can be placed at a location that can comfortable for each vehicle operator.

For example, the adjustment assembly can permit the vehicle operator to pivot, in a vertical plane, the upper steering shaft 104 relative to the middle steering shaft 106 between a plurality of tilt positions. The plurality of tilt positions can permit the vehicle operator to raise or lower the steering wheel 42 shown in FIG. 1 relative to the vehicle operator. The lever 102 can be operative to permit the vehicle operator to selectively lock and unlock the adjustment assembly in order to selectively lock and unlock the steering wheel 42 in the desired position. A flexible, torque-transmitting coupling can connect the upper steering shaft 104 to the middle steering shaft 106 and can permit the relative pivoting motion of the upper steering shaft 104.

Embodiments are intended to include an adjustment assembly that can permit the upper steering shaft 104 to telescope along the steering axis S shown in FIG. 4 toward or away from the vehicle operator. This telescopic motion can be in lieu of, or in addition to, the pivotal motion described above.

As will be discussed in further detail below, the mounting brackets 98, 100 can be configured to provide an advantageous mounting configuration for the steering assembly 32 that can reduce or prevent vibration(s) that can be perceived by the vehicle operator as undesirable. The mounting brackets 98, 100 can be connected to the housing 112 in any appropriate manner, such as but not limited to mechanical fasteners, welding, adhesive, or any combination thereof.

The housing 112 can rotatably support the upper steering column 104 in any appropriate manner, such as but not limited to rolling element bearing(s) and plain bearings, or any combination thereof. The adjustment assembly can permit the upper steering shaft 104 to move relative to the housing 112. However, embodiments are intended to include an adjustment assembly that can permit the housing 112 to move with the upper steering shaft 104 if the vehicle operator adjusts the position of the steering wheel 42.

Exemplary embodiments are intended to include a housing 112 that can contain and/or support at least one component in addition to the upper steering shaft 104. For example, the housing 112 can be configured to house a steering angle sensor, a steering torque sensor, and/or a power steering motor. The housing 112 can be formed with any appropriate shape that can package or otherwise enclose the component(s) contained and/or supported therein. In the exemplary embodiment of FIGS. 1-8, the housing 112 can have an irregular shape. However, exemplary embodiments are intended to include a housing 112 that can be generally cylindrical if the housing 112 supports only the upper steering shaft 104.

Thus, the steering column assembly 44 can be supported by the frame assembly 40 by way of the mounting brackets 98, 100 and the housing 112.

The first mounting bracket 98 can include a pair of holes 114, 116 that can be aligned with the lower mounting points 72, 74, respectively. The first mounting bracket 98 can be connected to the lower mounting points 72, 74 with bolts. The bolts are omitted from the figures for simplicity and clarity of the figures.

Referring to FIG. 4, each bolt can extend through one of the holes 114, 116 in first mounting bracket 98 and one of the mounting points 72, 74 along a first bolt axis B1. The first bolt axis B1 can be substantially parallel to the middle position (represented by the shaft axis S in FIG. 4) of the plurality of tilt positions afforded to the upper steering shaft 104 by the adjustment assembly. If an adjustment assembly is omitted from the mounting assembly 96, then the first bolt axis B1 can be substantially parallel to the shaft axis S of the upper steering shaft 104. This orientation of the bolts can reduce the bending moment applied to the first mounting bracket 98.

Referring to FIG. 7, the second mounting bracket 100 can include a pair of holes 118, 120. The holes 118, 120 can be aligned with a pair of rear mounting points, respectively on the central beam portion 76 of the frame assembly 40. FIG. 4 shows one of the two rear mounting points indicated at 122—the second rear mounting point is obscured by the first rear mounting point 122. The second mounting bracket 100 can be connected to the rear mounting points 122 with bolts. The bolts are omitted from the figures for simplicity and clarity of the figures.

Referring to FIG. 4, each bolt can extend through one of the holes 118, 120 in second mounting bracket 100 and one of the mounting points 122 along a second bolt axis B2. The second bolt axis B2 can be substantially perpendicular to the middle position (represented by the shaft axis S in FIG. 4) of the plurality of tilt positions afforded to the upper steering shaft 104 by the adjustment assembly. If an adjustment assembly is omitted from the mounting assembly 96, then the second bolt axis B2 can be substantially perpendicular to the shaft axis S of the upper steering shaft 104. This orientation of the bolts can enhance the ease of assembly of the steering assembly 32 to the frame assembly 40.

Exemplary embodiments are intended to include the mounting brackets 98 100 connected to the respective lower and rear mounting points 72, 74, 122 in any appropriate manner, such as but not limited to threaded fasteners, rivets, adhesive, welding, etc.

The mounting brackets 98, 100 can span the recessed portion of the central beam portion 76. The lower and rear mounting points 72, 74, 122 can be positioned on a respective one of the left and right beam portions 78, 80. The mounting brackets 98, 100 can cooperate with the left and right beam portions 78, 80 so as to maintain structural continuity of the central beam portion 76 despite the presence of the recessed portion that is defined by the concave lower surface 90. This structural continuity can enhance the rigidity of the central beam portion in the area of the recessed portion. In other words, the mounting brackets 98, 100 make-up for some or all of the reduced weakness of the central beam portion 76 that is caused at least in part by the recessed portion, which provides the advantages disclosed above, i.e., reduced vibration transmission.

IV. Potential Merits of the Frame Assembly

The recessed portion defined by the concave lower surface 90 formed in the central beam portion 76 can accommodate a portion of the steering assembly 32 within the general perimeter of the frame assembly 40. As a result, the distance D shown in FIG. 4 between the centroid 86 and the center point 88 of the steering wheel 42 shown in FIG. 1 can be reduced.

Furthermore, the large cross-section of the left and right beam portions 78, 80 does not have to pass above the steering assembly 32. The mounting assembly 96 can provide structural continuity between the left and right beam portions 78, 80 and across the recessed portion. Thus, the frame assembly 40 can increase packaging space above the frame assembly in the region adjacent to the steering assembly 32 without increasing the potential for undesirable vibration(s) in the steering wheel 42.

Additionally, the frame assembly 40 can include a main beam portion 54 that can have an enhanced rigidity via the large cross-sectional size of the left and right beam portions 78, 80. Therefore, the frame assembly 40 can reduce or eliminate vibration(s) in the steering wheel 42 that might be perceived by a vehicle operator as undesirable, can provide an efficient packaging of the steering assembly 32, and can enhance the packaging space available for other component(s) and/or systems(s) on or adjacent to the frame assembly 40.

VI. Alternative Embodiments

While certain embodiments of the invention are described above, and FIGS. 1-8 disclose the best mode for practicing the various inventive aspects, it should be understood that the invention can be embodied and configured in many different ways without departing from the spirit and scope of the invention.

For example, embodiments are disclosed above in the context of instrument panel assembly shown in FIG. 1. However, embodiments are intended to include or otherwise cover any type of instrument panel assemblies disclosed above. For example, the instrument panel assembly can include more than or less than the number and type of trim panels; more than or less than the number of air vents, etc. In another alternate embodiment, the steering assembly can be mounted to the right side of the instrument panel frame, and the glove box can be located on the left side of the instrument panel assembly.

In the above embodiments, the recessed portion of the central portion 76 of the main beam portion 54 is provided in an arcuate shape. However, embodiments are intended to include or otherwise cover any shape that provides the requisite open area to achieve some or all of the advantages discussed above.

In the above embodiments, the recessed portion is provided in the central portion 76 of the main beam portion 54. However, the recessed portion can be provided at any other location of the main beam portion 54, and in fact can be provided in either or both of the center stack portion 56 and glove box portion 58, such as to enable or otherwise facilitate connection to components other than a steering shaft.

In the above embodiments, mounting brackets 98, 100 are used to mount the steering assembly 32, while at the same time enhancing the stiffness of the central beam portion 76 (such as by making-up for weakness created by the recessed portion). However, embodiments are intended to include or otherwise cover any structure or structures for performing these operations.

Embodiments are also intended to include or otherwise cover methods of using and methods of manufacturing the instrument panel assembly disclosed above. The methods of manufacturing include or otherwise cover processors and computer programs implemented by processors used to design various elements of the apparatus disclosed above.

For example, exemplary embodiments are intended to cover all software or computer programs capable of enabling processors to implement the above operations, designs and determinations. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed above.

While the subject matter has been described in detail with reference to exemplary embodiments thereof, it will be apparent to one skilled in the art that various changes can be made, and equivalents employed, without departing from the scope of the invention. All related art references discussed in the above Background section are hereby incorporated by reference in their entirety.

What is claimed is:

1. A frame assembly for supporting a vehicle steering assembly that includes a steering wheel connected to a steering column assembly, the frame assembly comprising:
   a supplemental beam portion;
   a main beam portion adjacent the supplemental beam portion, the main beam portion including a central portion as well as left and right portions disposed at opposing sides of the central portion, the central portion defining a recessed portion with an opening, and the main beam portion defining a pair of holes, the recessed portion located between the pair of holes, and each of the holes extending along an axis that is substantially parallel to an axis of the steering column assembly that passes through the opening, wherein the main beam portion is shaped such that the left and right portions each define in aggregate a relatively larger cross-sectional area than the central portion, the opening being configured to enable the central portion to be able to at least partially enclose the steering column assembly; and
   a mounting assembly that is configured to mount the steering column assembly to the main beam portion with the central portion at least partially enclosing the steering column assembly.

2. The frame assembly according to claim 1, wherein the left and right portions of the main beam portion define substantially similar cross-sections.

3. The frame assembly according to claim 1, wherein the recessed portion includes a first lower edge on a lower-most longitudinal surface and a second upper edge on an uppermost longitudinal surface, the first lower edge and the second upper edge each having a longitudinal and a vertical separation, and wherein a surface between the first lower edge and second upper edge tapers both longitudinally and vertically into a plane defined by an intersection of the first lower edge and the second upper edge, and wherein the mounting assembly includes a front mounting bracket that is configured to connect a front section of the steering column assembly to the main beam portion.

4. The frame assembly according to claim 3, wherein the mounting assembly includes a first pair of bolts that are configured to extend through holes defined in the front mounting bracket along an axis that is substantially parallel to an axis of the steering column assembly.

5. The frame assembly according to claim 4, wherein the mounting assembly includes a rear mounting bracket that is configured to connect a rear section of the steering column assembly to the main beam portion.

6. The frame assembly according to claim 5, wherein the mounting assembly includes a second pair of bolts that are configured to extend through holes defined in the rear mounting bracket along an axis that is substantially perpendicular to the axis of the first pair of bolts.

7. The frame assembly according to claim 1, wherein the recessed portion of the central portion defines a generally arcuate shape in cross-section.

8. The frame assembly according to claim 1, wherein the recessed portion is configured to reduce a distance separating a center-point of the steering wheel and a centroid of the main beam portion so as to reduce vibrations transmitted to the steering wheel during operation of the vehicle.

9. The frame assembly according to claim 1, wherein the supplemental beam portion includes a center stack portion adjacent the main beam portion, and a glove box portion disposed adjacent the center stack portion opposite the main beam portion.

10. The frame assembly according to claim 9, wherein the main beam portion, center stack portion, and glove box portion are unitarily formed.

11. The vehicle instrument panel assembly according to claim 1, wherein the supplemental beam portion includes a center stack portion adjacent the main beam portion, and a glove box portion disposed adjacent the center stack portion opposite the main beam portion; and wherein the main beam portion, center stack portion, and glove box portion are unitarily formed.

12. A vehicle instrument panel assembly, comprising:
    a vehicle steering assembly that includes a steering wheel including a steering wheel center point connected to a steering column assembly including a steering column axis;
    a frame assembly for supporting the steering wheel assembly, the frame assembly including a supplemental beam portion, and a main beam portion adjacent the supplemental beam portion, the main beam portion including an upper surface and a side surface abutting the upper surface at an angle, the upper surface extending in a longitudinal direction of the vehicle away from the side surface and terminates at an end such that the side surface lies between the end and the steering wheel, and the side surface faces toward the steering wheel;
    a mounting assembly that is configured to mount the steering column assembly to the main beam portion, the mounting assembly including a front mounting bracket that connects a front section of the steering column assembly to the main beam portion; and
    a first pair of bolts that extend through holes defined in the front mounting bracket and holes defined in the side surface along an axis that is substantially parallel to an axis of the steering column assembly, the mounting assembly also including a rear mounting bracket that connects a rear section of the steering column assembly to the main beam portion, and a second pair of bolts that extend through holes defined in the rear mounting bracket along an axis that is substantially perpendicular to the axis of the first pair of bolts.

13. The vehicle instrument panel assembly according to claim 12, wherein the main beam portion includes a central portion as well as left and right portions disposed at opposing sides of the central portion.

14. The vehicle instrument panel assembly according to claim 13, wherein the central portion defines a recessed portion that is shaped such that the left and right portions each define in aggregate a relatively larger cross-sectional area than the central portion.

15. The vehicle instrument panel assembly according to claim 14, wherein the recessed portion is configured to enable the central portion to be able to at least partially enclose the steering column assembly.

16. The vehicle instrument panel assembly according to claim 15, wherein the mounting assembly is configured to also enhance stiffness of the central portion.

17. The vehicle instrument panel assembly according to claim 14, wherein the recessed portion of the central portion defines a generally arcuate shape in cross-section.

18. The vehicle instrument panel assembly according to claim 14, wherein the recessed portion is configured to reduce a distance separating a center-point of the steering wheel and a centroid of the main beam portion so as to reduce vibrations transmitted to the steering wheel during operation of the vehicle.

19. The vehicle instrument panel assembly according to claim 13, wherein the left and right portions of the main beam portion define substantially similar cross-sections.

20. A method of manufacturing a vehicle instrument panel assembly, the method comprising:

connecting a steering wheel to a steering column assembly so as to form a vehicle steering assembly;

forming a frame assembly that is capable of supporting the steering wheel assembly, the forming of the frame assembly including:

disposing a supplemental beam portion adjacent a main beam portion;

forming the main beam portion so as to include a central portion as well as left and right portions disposed at opposing sides of the central portion;

defining a pair of holes in the main beam portion such that each of the holes extends along an axis that is substantially parallel to an axis of the steering column assembly that passes through the opening; and defining a recessed portion in the central portion with an opening, the recessed portion located between the pair of holes, the recessed portion being shaped such that the left and right portions each define in aggregate a relatively larger cross-sectional area than the central portion, and being configured to enable the central portion to be able to at least partially enclose the steering column assembly;

mounting the steering column assembly to the main beam portion with a mounting assembly, such that the central portion at least partially encloses the steering column assembly; and reinforcing the central portion with the mounting structure.

\* \* \* \* \*